(12) United States Patent
Quayle et al.

(10) Patent No.: US 7,216,830 B2
(45) Date of Patent: May 15, 2007

(54) WING GULL INTEGRATION NACELLE CLEARANCE, COMPACT LANDING GEAR STOWAGE, AND SONIC BOOM REDUCTION

(75) Inventors: Brian Quayle, Lancaster, CA (US); John M. Morgenstern, Lancaster, CA (US); Alan E. Arslan, Santa Clarita, CA (US)

(73) Assignee: Supersonic Aerospace International, LLC, Las Vegas, NV (US)

( * ) Notice: Subject to any disclaimer, the term of this patent is extended or adjusted under 35 U.S.C. 154(b) by 135 days.

(21) Appl. No.: 10/655,707

(22) Filed: Sep. 5, 2003

(65) Prior Publication Data
US 2005/0067526 A1  Mar. 31, 2005

(51) Int. Cl.
*B64C 3/10* (2006.01)
*B64C 25/10* (2006.01)

(52) U.S. Cl. .................. 244/15; 244/102 R; 244/45 R; 244/87; 244/1 N; 244/47

(58) Field of Classification Search .................. 244/15, 244/45, 45 A, 73 R, 74, 54, 55, 102 R, 87
See application file for complete search history.

(56) References Cited

U.S. PATENT DOCUMENTS

| | | | | |
|---|---|---|---|---|
| 2,484,660 A | * | 10/1949 | Thireau | .................. 244/102 R |
| 3,171,619 A | * | 3/1965 | Alesbury | ................. 244/102 R |
| 3,310,262 A | * | 3/1967 | Robins et al. | ............ 244/45 R |
| 4,598,886 A | * | 7/1986 | Friebel et al. | ................. 244/15 |
| 4,828,204 A | * | 5/1989 | Friebel | ......................... 244/15 |
| 5,000,400 A | * | 3/1991 | Stuhr | ...................... 244/102 R |
| 5,269,481 A | * | 12/1993 | Derrien | ................... 244/102 R |
| 5,482,228 A | | 1/1996 | Hoshino | |
| 5,692,703 A | | 12/1997 | Murphy et al. | |
| 5,934,607 A | | 8/1999 | Rising et al. | |
| 6,273,364 B1 | | 8/2001 | Tizac et al. | |
| 6,279,853 B1 | | 8/2001 | Brighton | |
| 6,340,134 B1 | | 1/2002 | Meschino | |
| 6,481,668 B2 | | 11/2002 | Grossman | |
| 6,575,406 B2 | * | 6/2003 | Nelson | ........................ 244/119 |
| 6,651,928 B1 | * | 11/2003 | Stuhr | ........................ 244/53 B |
| 6,679,452 B1 | * | 1/2004 | Cottet et al. | ............. 244/102 R |

\* cited by examiner

*Primary Examiner*—Galen Bareoot

(57) ABSTRACT

A supersonic cruise configuration aircraft comprises a fuselage extending on a longitudinal axis from a forward nose to an aft tail, and a wing coupled at an inboard section to the fuselage and extending to an outboard tip, and having a leading edge and a trailing edge. The aircraft further comprises a landing gear that is coupled to the wing and capable of stowing into the wing and fuselage on retraction. The landing gear has a landing gear strut. The wing is gulled with a dihedral at an angle that is increased inboard and aligns with the retracted landing gear. The wing has a minimum thickness sufficient to enclose the landing gear.

20 Claims, 14 Drawing Sheets

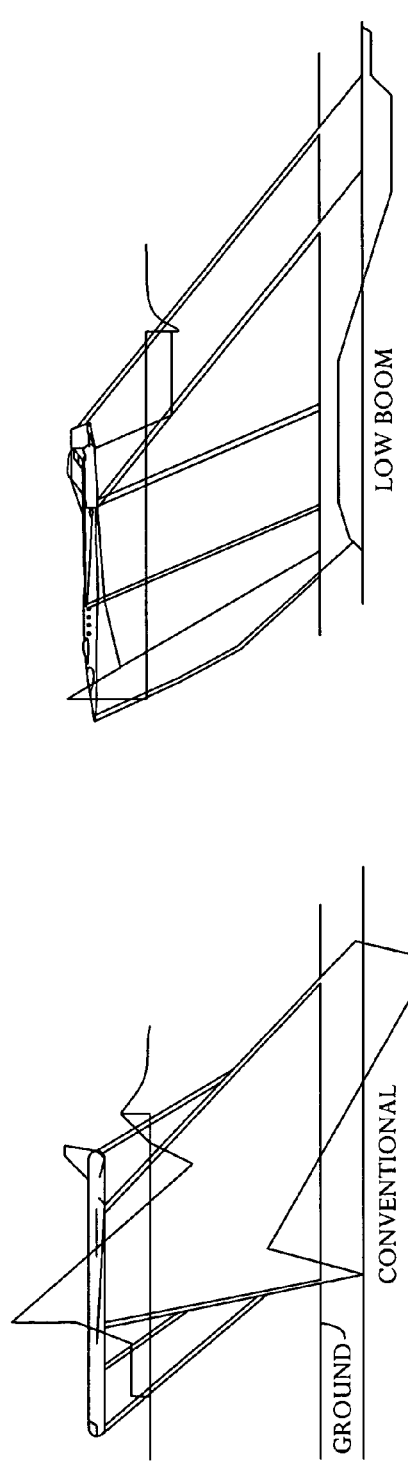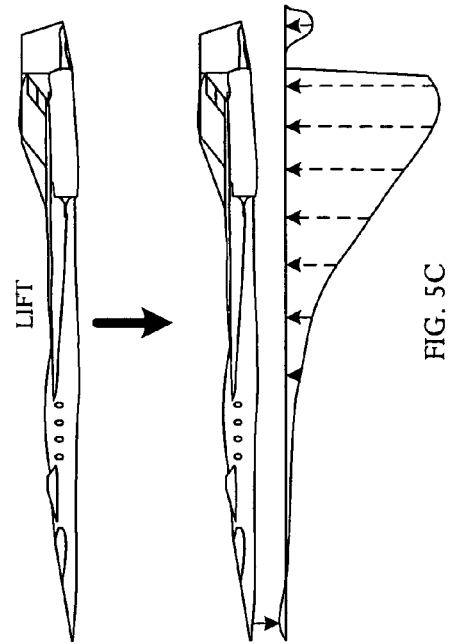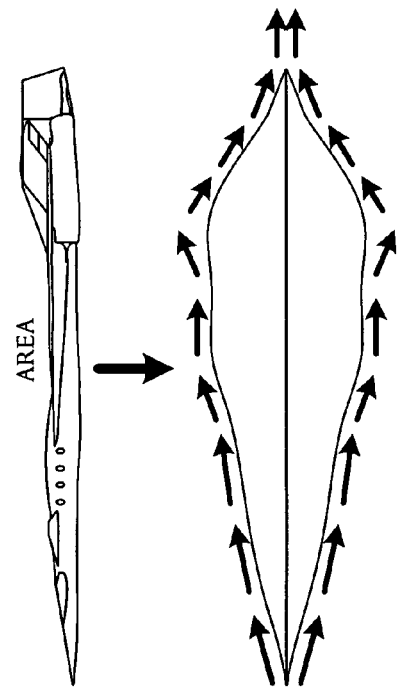
FIG. 5D
FIG. 5C
FIG. 5A
FIG. 5B

WING GULL INTEGRATION NACELLE CLEARANCE, COMPACT LANDING GEAR STOWAGE, AND SONIC BOOM REDUCTION

BACKGROUND OF THE INVENTION

Supersonic flight over the United States and other countries is a challenging environmental issue for a viable supersonic commercial aircraft. Current FAA regulations prohibit civil flights at Mach numbers greater than one without case-by-case exceptions approved by the Administrator. Many other countries have similar restrictions.

Previous research has shown that the highly impulsive nature of the "N-wave" sonic-boom signatures of all existing supersonic aircraft is the primary cause of negative response and regulatory limitations on supersonic travel. Conclusions of NASA research further indicate the exceptional difficultly of designing an aircraft with an "N-wave" signature of sufficiently low amplitude for general public acceptance. However, the research also found that a "shaped" signature was less objectionable and that a reasonably achievable amplitude wave could meet Committee on Hearing and Bioacoustics of the National Research Council (CHABA) guideline for acceptable noise impact to the general public, depending on frequency of exposure.

A sonic boom occurs due to pressure waves that occur when an aircraft moves at supersonic speeds. During subsonic flight, air displaced by a passing plane flows around the plane in the manner water flows around an object in a stream. However, for a plane flying at supersonic speeds, the air cannot easily flow around the plane and is instead compressed, generating a pressure pulse through the atmosphere. The pressure pulse intensity decreases as a consequence of movement from the airplane, and changes shape into an N-shaped wave within which pressure raises sharply, gradually declines, then rapidly returns to ambient atmospheric pressure. A wall of compressed air that moves at airplane speed spreads from the wave and, in passing over ground, is heard and felt as a sonic boom. The rapid changes in pressure at the beginning and end of the N-wave produce the signature double bang of the sonic boom.

Research has recently shown that boom intensity can be reduced by altering aircraft shape, size, and weight. For example, small airplanes create a smaller amplitude boom due to a lower amount of air displacement. Similarly, a lighter aircraft produces a smaller boom since an airplane rests on a column of compressed air and a lighter plane generates a lower pressure column. An aircraft that is long in proportion to weight spreads the N-wave across a greater distance, resulting in a lower peak pressure. Furthermore, wings that are spread along the body and not concentrated in the center as in a conventional aircraft produces a pressure pulse that is similarly spread, resulting in a smaller sonic boom.

Shaping of a sonic boom refers to a technique of altering source pressure disturbance such that a non-N-wave shape is imposed on the ground. Shaping sonic boom can reduce loudness by 15–20 dB or higher with no added energy beyond that to sustain flight. Shaping to minimize loudness is based on insight regarding changes in aircraft pressure disturbances during propagation to the ground.

Shaped sonic booms are only achieved deliberately. No existing aircraft creates a shaped sonic boom that persists for more than a fraction of the distance to the ground while flying at an efficient cruise altitude since non-shaped pressure distributions quickly coalesce into the fundamental N-wave shape. The N-wave form generates the largest possible shock magnitude from a particular disturbance. The N-wave shape results because the front of a supersonic aircraft generates an increase in ambient pressure while the rear generates a decrease in pressure. Variation in propagation speed stretches the disturbance during propagation to the ground. Shaped boom techniques typically attempt to prevent coalescing of the pressure disturbance by adding a large compression at the aircraft nose and an expansion at the tail with pressure in between constrained between the compression and expansion. The shaped boom stretches the ends of the signature faster than the in-between pressures, creating a non-N-wave sonic boom at the ground.

Boom reduction makes a supersonic aircraft less objectionable by minimizing the loudness of a sonic boom. Audible frequencies in a sonic boom occur in the rapid pressure changes, or shocks, at the beginning and end of the typical N-waveform. More quiet shocks have decreased pressure amplitudes and increased pressure change time durations.

Although sonic boom reduction is an important design criterion for a supersonic aircraft, other considerations always impact design decisions. For example, a useful aircraft will have an appropriate capacity for holding passengers and/or cargo and be a suitable configuration for safe operation. Some design aspects include integration of landing gear and airframe.

SUMMARY OF THE INVENTION

What is desired is a supersonic aircraft with appropriate tail clearance for takeoff and landing and a landing gear configuration that facilitates the appropriate tail clearance while stowing in a compact arrangement.

In accordance with some embodiments of the disclosed aeronautical system, a supersonic cruise configuration aircraft comprises a fuselage extending on a longitudinal axis from a forward nose to an aft tail, and a wing coupled at an inboard section to the fuselage and extending to an outboard tip, and having a leading edge and a trailing edge. The aircraft further comprises a landing gear that is coupled to the wing and capable of stowing into the wing and fuselage on retraction. The landing gear has a landing gear strut. The wing is gulled with a dihedral at an angle that is increased inboard and aligns with the retracted landing gear. The wing has a minimum thickness sufficient to enclose the landing gear.

According to other embodiments, an aircraft comprises a fuselage extending on a longitudinal axis from a forward nose to an aft tail, a wing coupled at an inboard section to the fuselage and extending to an outboard tip, and having a leading edge and a trailing edge, a leading edge flap coupled to the leading edge of the wing, and a landing gear. The landing gear is coupled to the wing and capable of stowing into the wing and fuselage on retraction. The landing gear stows within the wing at a selected chordwise location between the wing leading and trailing edges. The wing has an inboard dihedral that is straight near the leading edge and angled at the chordwise location of the landing gear to facilitate leading edge flap deployment and sealing.

In additional embodiments, a supersonic aircraft comprises a fuselage extending along a longitudinal axis forward and aft, a wing coupled inboard to the fuselage and extending outboard, at least two engines coupled beneath the wing, and at least two nacelles encasing the engines and coupled beneath the wing at an aft position. The wing has a leading edge, a trailing edge, and a gull that is most pronounced inboard. The wing gull having a slight outboard dihedral in a range from 0° to 5° to enable gravity fuel feed assistance from the outboard wing inboard toward the engines while reducing outboard wing dihedral.

In accordance with further embodiments, an aircraft comprises means for lifting the aircraft and extend from inboard bilaterally to outboard ends, and means for supporting the aircraft on the ground in motion and when the aircraft is stationary. The supporting means is coupled to the lifting means and capable of stowing within the lifting means when the supporting means is retracted. The lifting means is gulled with a dihedral at an angle that is largest inboard and aligns with the retracted supporting means. The lifting means has a minimum thickness sufficient to enclose the supporting means.

BRIEF DESCRIPTION OF THE DRAWINGS

Embodiments of the invention relating to both structure and method of operation, may best be understood by referring to the following description and accompanying drawings.

FIGS. 5A, 5B, 5C, and 5D show a series of graphs that illustrate theory upon which a low sonic boom signature is attained by controlling deployment of the thickness/camber control device.

DETAILED DESCRIPTION OF THE EMBODIMENTS

Figure 1A:
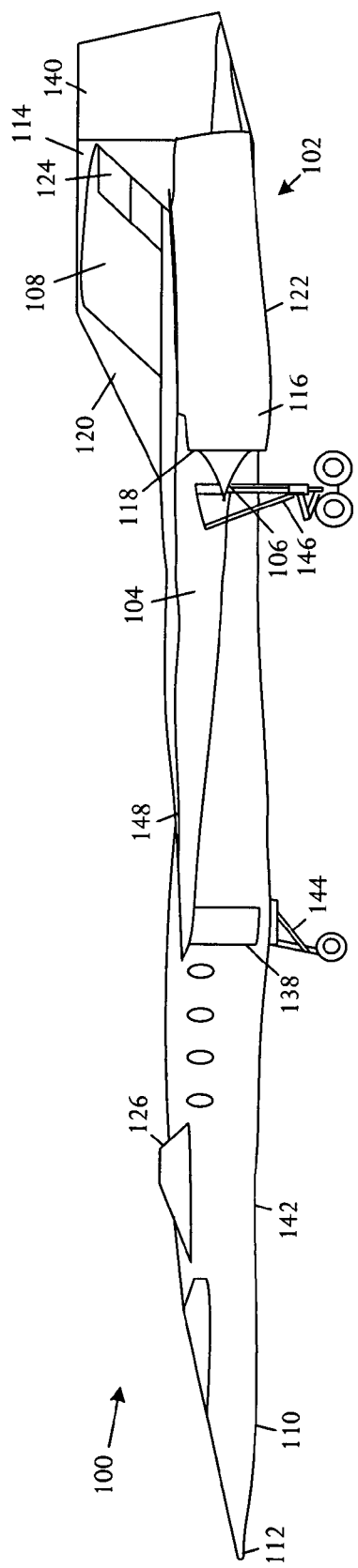
FIGS. 1A, 1B, and 1C are schematic pictorial diagrams respectively showing side, front, and top views of a supersonic aircraft with an integration of airfoil, nacelle, and landing gear for sonic boom reduction.
Figure 1B:
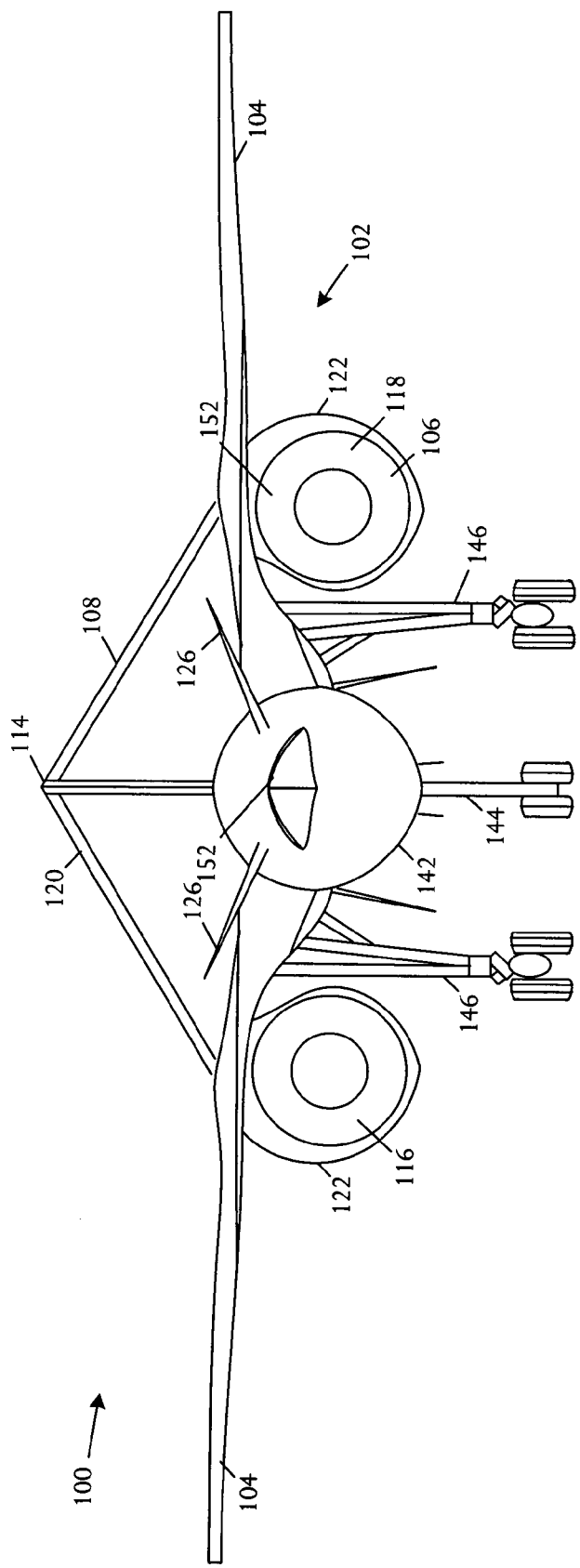
Figure 1C:
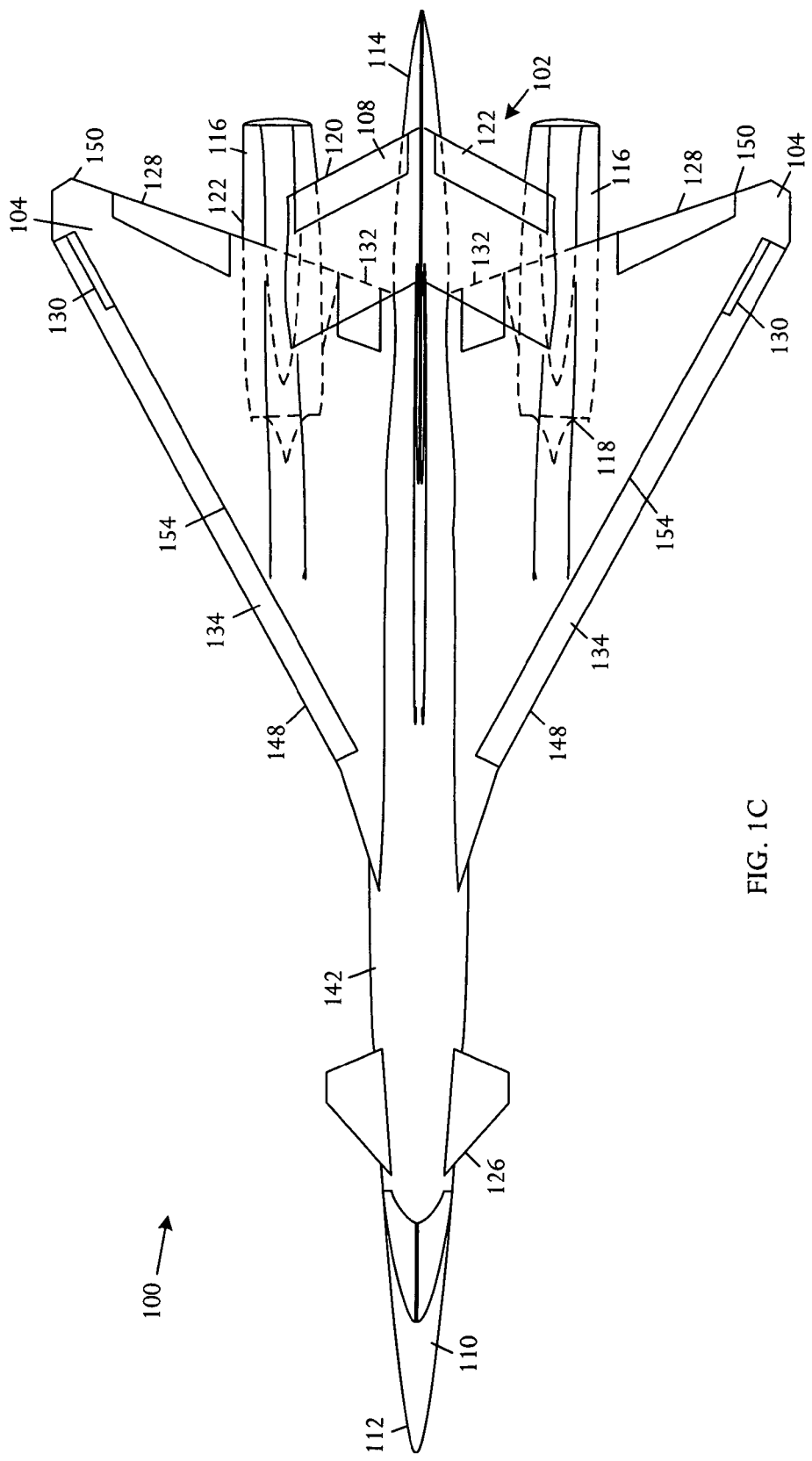

Referring to FIGS. 1A, 1B, and 1C, schematic pictorial diagrams respectively showing side, front, and top views of a supersonic cruise configuration aircraft 100 comprising a fuselage 142 extending on a longitudinal axis from a forward nose 110 to an aft tail 114. A wing 104 is coupled at an inboard section to the fuselage 142 and extends to an outboard tip, and has a leading edge and a trailing edge. The aircraft 100 further comprises a landing gear 146 that is coupled to the wing 104 and can of stowing into the wing 104 and fuselage 142 on retraction. The landing gear 146 has a landing gear strut. The wing 104 is gulled with a dihedral at an angle that is increased inboard and aligns with the retracted landing gear 146. The wing 104 has a minimum thickness sufficient to enclose the landing gear 146.

In some embodiments, the aircraft 100 further comprises a leading edge flap 134, for example a Krueger flap, which is coupled to the leading edge of the wing 104. The leading edge flap 134 begins at a location outboard of the elevated-dihedral inboard wing portion and extends outboard a selected distance. In some embodiments, the leading edge flap can extend to the wing tip. The wing 104 is highly swept and has a reduced outboard dihedral relative to the larger inboard wing dihedral. The outboard dihedral being essentially straight near the wing leading edge.

An engine 116 is coupled to the wing lower surface inboard of the wing outboard portion. In some embodiments, the wing is gulled and has a slight outboard dihedral in a range from 0° to 5° to enable gravity fuel feed assistance from the outboard wing toward the more inboard engine while reducing outboard wing dihedral. In a particular embodiment, the slight outboard dihedral has an angle of approximately 2°.

The fuselage 142 can have a flattened or elliptical cross-section that houses the landing gear 146 when stowed and reduces aircraft cross-sectional area. In some embodiments, the fuselage 142 has a flattened or elliptical cross-section that reduces aircraft cross-sectional area while maintaining width, increasing directional stiffness and raising the fuselage lower surface for increased ground clearance.

The aircraft 100 further comprises a cabin door 138 formed into the fuselage side for entry and exit to the aircraft 100. In some embodiments, the wing 104 or other aerodynamic lift device, such as a strake can form a high-incidence airfoil angle wing leading edge or strake intersection with the fuselage 142 that enables the wing 104 to function as a rain gutter above the open door 138.

In some examples, the illustrative aircraft arrangement 100 has twin non-afterburning turbofan engines 116 set below and behind the wing 104. The non-afterburning turbofan engines 116 operate behind simple fixed-geometry axisymmetric external compression inlets 118. Considerations of community noise and takeoff, transonic, and cruise thrust specifications determine engine cycle selection and engine sizing. Nacelles 122 enclose the engines 116 and are coupled to lower surface the wings 104 at the wing trailing edge 150. The wing 104 has an inboard portion configured to integrate with the nacelle 122 and form the dihedral gull 152 that enhances low-sonic-boom signature by vertically staggering airfoil longitudinal lift distribution.

In some embodiments, the aircraft can have an inverted V-tail geometry 108 that generates low-sonic-boom longitudinal trim in cruise and structural support for the integration of airfoil, nacelle, and landing gear for sonic boom reduction 102.

In the illustrative embodiment, the aircraft 100 has an elongated nose 110 with a conical tip 112 and an inverted V-tail surface 108 that overlaps the wing 104, features that facilitate low-sonic-boom aircraft performance. The configuration suppresses features of a sonic boom pressure waveform that otherwise would make the boom audible. The supersonic aircraft 100 creates an N-shaped pressure wave caused by overpressure at the nose 110 and underpressure at the tail 114. Pressure rises rapidly at the nose 110, declines to an underpressure condition at the tail 114, and then returns to ambient pressure. Rapid pressure rises at the front and rear of the pressure wave producing the characteristic double explosion of the sonic boom.

In some embodiments, the conical tip 112 of the nose 110 can be configured to create a pressure spike ahead of the aircraft forward shock, raising local temperature and sound velocity, thereby extending the forward shock and slowing the pressure rise. The supersonic aircraft 100 has a sharply swept arrow wing configuration 104 that reduces peak overpressure in the wave by spreading wing lift along the aircraft length. The wing configuration 104 has reduced wing leading and trailing edge sweeps. The inverted V-tail 108 can generate additional lift near the tail to improve aerodynamics and reduce boom.

The shaping of the supersonic aircraft 100 including aspects of the wing 104, the tail assembly or empennage 120, and the integration of airfoil, nacelle, and landing gear for sonic boom reduction 102 are adapted according to sonic boom signature and supersonic cruise drag considerations. The empennage or tail system 120 includes stabilizers, elevators, and rudders in the inverted V-tail geometry 108. The inverted V-tail geometry 108 supports nacelles 122 in highly suitable positions relative to the wing 104 to suppress boom, and trims the supersonic aircraft 100 in cruise to attain an improved low-boom lift distribution. Panels of the inverted V-tail 108 support the nacelles 122 and non-afterburning turbofan engines 116 in combination with support of the wing 104 to handle flutter. Inverted V-tail control surfaces, termed ruddervators 124, adjust aircraft longitudinal lift distribution throughout the flight envelope to maintain a low boom, low drag trim condition.

In the illustrative embodiment, the aircraft wings 104, empennage, and propulsion system integration can be configured for reduced sonic boom signature and supersonic cruise drag. The aircraft 100 further includes an inverted V-tail geometry that reduces boom amplitude, supports engine nacelles 122 in appropriate positions relative to the wings 104, and facilitates aircraft trimming in cruise to attain an optimum low-boom lift distribution. Usage of the V-tail geometry to supplement the wings' support of the engine nacelles improves flutter performance.

Inverted V-tail control surfaces 124, termed "ruddervators," adjust aircraft longitudinal lift distribution throughout the flight envelope to maintain a low boom, low drag trim condition. The wings 104 have a substantial dihedral, or "gulling", incorporated into the wing inboard of the engines 116, a geometry that is most pronounced at the wing trailing edge. The gull 152 is produced by twisting and cambering the wing to produce low-boom and low induced drag while preserving a tailored local wing contour at the location of main landing gear retraction.

In some embodiments, the wing leading edge 148 has a substantially straight geometry to accommodate a simple hinge line 154 for a Krueger flap 134 that extends for the full length of the wings 104. The inboard wing integrates with the nacelle and diverter geometry, and follows the fuselage contour with a substantially normal intersection to reduce interference drag. An inboard wing flap hinge line is fully contained within the wing contour with upper and lower wing surfaces configured as planar as possible to facilitate aerodynamic performance.

The wing gull 152 raises the engines 116 to increase available tip-back angle and reduce thrust-induced pitching moments. The wing gull 152 lowers the aircraft body to reduce the cabin door height above the ground and reduce entry stair length. The low fuselage 142 sets a low aircraft center of gravity, reducing tip-over angle and promoting ground stability. The gull 152 tends to "wrap" the wing around the nacelle 122, enhancing favorable interference between the inlets 118 and the wings 104, so that the resulting wing/body/nacelle geometry facilitates successful ditching and gear-up landings. In addition, the wing gull 152 enhances the aircraft low-boom signature by vertically staggering the longitudinal lift distribution of the wings 104.

In some embodiments, the supersonic aircraft 100 can include a canard 126 that operates primarily as a longitudinal power control device, particularly effectively during takeoff and in high-speed flight. The canard 126 also functions to fine tune the aircraft longitudinal trim condition. The canard 126 augments rudder operation by supplying yaw control power when left and right canard surfaces are deflected differentially.

The supersonic aircraft 100 includes segmented ailerons 128 that supply roll control power and automatic wing camber control to improve lift and drag conditions through the flight envelope. High-speed spoilers 130 supplement aileron roll power at transonic and supersonic speeds where Mach and aeroelastic effects reduce aileron effectiveness. The supersonic aircraft 100 has a high lift system including an inboard trailing edge flap 132 and a full-wingspan leading edge Krueger flap 134.

The supersonic aircraft 100 has multiple stability and control effectors. The canard 126 and symmetric deflections of the ruddervators 124 control pitch power. A vertical rudder 140 controls yaw. Inboard, midboard and outboard ailerons 128, and the high speed roll spoilers 130 control roll. The roll spoilers 130 are configured to control roll at supersonic Mach numbers. In an illustrative embodiment, trailing edge (TE) flaps 136 are deployed 300 down to generate additional lift during landing. TE flap deployment reduces angle-of-attack specifications by approximately 2° during landing. During second-segment climb, the TE flaps 136 are extended 10° to improve the lift-to-drag ratio for better climb performance.

Leading edge (LE) Krueger flaps 134 are extended 130° for low speed operations including takeoff, approach and landing. The LE Krueger flaps 134 improve lift-to-drag ratio by 1.5, resulting in better climb performance that facilitates second-segment climb in case of engine malfunction.

The supersonic aircraft 100 includes multiple control surfaces, for example the ruddervators 124 inboard and outboard design, to enable continued operation and landing following single actuator failure or a single control surface jamming. Differential canard deflection can generate a yawing moment to counter a jammed rudder. Ailerons 128 and ruddervators 124 include multiple surfaces, increasing fault tolerant capability and supplying redundant elements for improved reliability.

The supersonic aircraft 100 has a fuselage 142 with a geometry configured to address multiple different objectives. The basic fuselage camber line and volume distribution address suitable crew vision concerns. The fuselage 142 is shaped to enable a level cabin floor with near-constant cabin height and a close-to-the-ground cabin door 138 with a relatively short entry stairway. The fuselage 142 has an internal volume suitable to contain multiple subsystems and a suitable amount of fuel in the body to attain an extended range. The fuselage shape integrates well with the wing 104 and empennage 120, with the entire aircraft configuration being conducive to attaining a low-boom signature and supersonic cruise drag levels. The supersonic aircraft 100 has a relatively short nose landing gear 144 and a main landing gear 146 that stow in a compact stowage volume. The wing 104 and/or fuselage 142 form an airfoil having aerodynamic characteristics appropriate for low-boom supersonic and transonic flight.

Figure 2A:
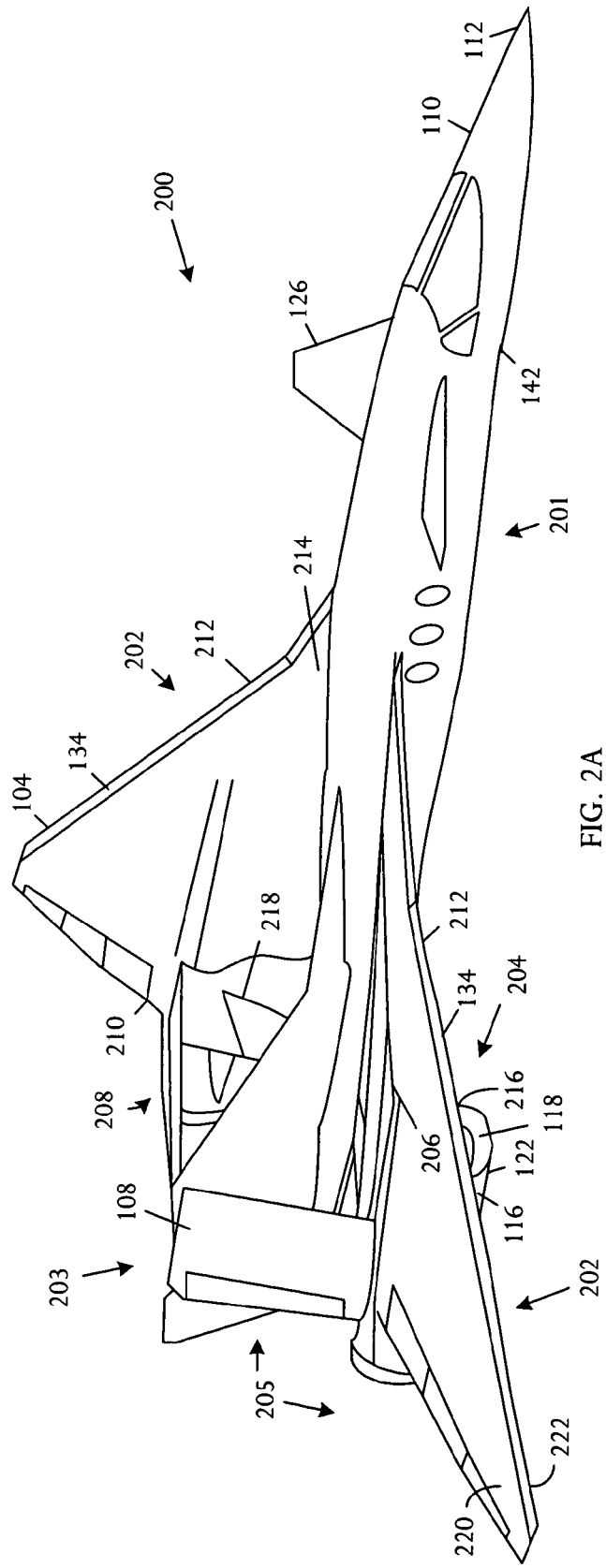
FIGS. 2A and 2B are respective perspective top and bottom views of the supersonic aircraft.
Figure 2B:
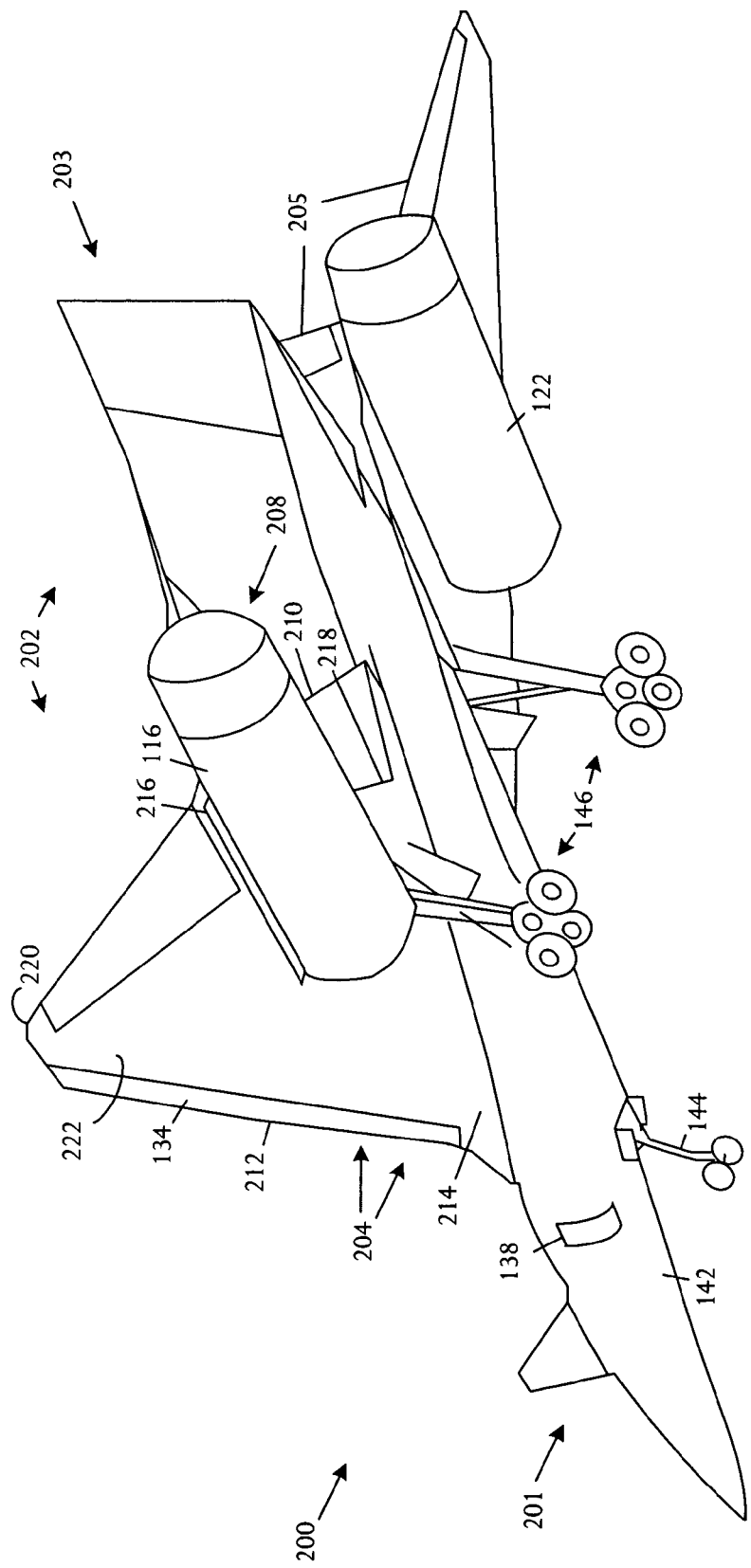

Referring to FIGS. 2A and 2B, perspective top and bottom views, respectively, of the supersonic aircraft 100 depict an airframe 200 including a body structure 201, a wing structure 202, a tail structure 203, a nacelle structure 204, and control surfaces 205. The aircraft 200 comprises a fuselage 142 that extends on a longitudinal axis from a forward nose to an aft tail, and a wing 104 coupled at an inboard section to the fuselage 142 and extending to an outboard tip, and having a leading edge and a trailing edge. A leading edge flap 134 is coupled to the leading edge of the wing 104. A landing gear 146 is coupled to the wing 104 and can stow into the wing 104 and fuselage 142 on retraction. The landing gear 146 stows within the wing 104 at a selected chordwise location between the wing leading and trailing edges. The wing 104 has an inboard 214 dihedral that is straight near the leading edge and angled at the chordwise location 206 of the landing gear 146 to facilitate leading edge flap deployment and sealing.

As shown in the illustrative embodiment, the leading edge flap 134 can extend the full-length of the wing leading edge inboard from the fuselage 142 to the outboard wing tip.

The substantial dihedral or "gulling" 208 incorporated into the wings 104 inboard of the engines 116 is most pronounced at the wing trailing edge 210. The gull or dihedral results from twisting and cambering the wing 104 for low-boom and low induced drag while preserving a tailored local wing contour in the position of main landing gear retraction. The wing gull can have a slight dihedral outboard of the engines 116 with the outboard dihedral in a range of approximately 0° to 5° to enable gravity fuel feed assistance from the outboard wing toward the more inboard engines 116 while reducing outboard wing dihedral.

In some embodiments, the inboard portion 214 of the wing 104 is configured to integrate with the nacelle 122 and a diverter 216 formed between the nacelle 122 and the wing 104 to follow the contour of a low-sonic-boom fuselage 142 with as close a normal intersection as possible to attain low interference drag. In some embodiments, an inboard flap hinge line 218 is fully contained within the wing contour with the wing upper 220 and lower 222 surfaces held as planar as possible to facilitate seal design.

With the resulting wing configuration, the wing gull 208 raises the engines 116 to increase available tipback angle and reduce thrust-induced pitching moments. The gull 208 enhances low-boom signature by vertically staggering the wing longitudinal lift distribution and lowers the aircraft body or fuselage 142 to reduce the height of the cabin door 138 above the ground, thereby reducing entry stair length. The low fuselage 142 assists in maintaining a low aircraft center of gravity, reducing tipover angle and promoting ground stability. The wing gull 208 forms a wrapping of the wing 104 around the nacelle 122 that enhances favorable interference between the inlets 118 and the wing 104, resulting in a wing/body/nacelle geometry conducive to successful ditching and gear-up landings.

Referring to FIGS. 3A through 3F, multiple schematic pictorial diagrams illustrate multiple views of an embodiment of a supersonic aircraft 300 that comprises a fuselage 310 extending along a longitudinal axis 305 forward and aft, and a wing 338 coupled inboard to the fuselage 310 and extending outboard. The aircraft 300 further comprises at least two engines 303 coupled beneath the wing 338, and at least two nacelles 328 encasing the engines 303 coupled beneath the wing 338 at an aft position.

The wing 338 has a gulled shape that is most pronounced at the inboard wing portion. The wing gull has a slight outboard dihedral in a range of approximately 0° to 5° to enable gravity fuel feed assistance from the outboard wing inboard toward the engines 303 while reducing outboard wing dihedral. In a particular embodiment, the slight outboard dihedral is approximately 2°.

The aircraft 300 has a nose landing gear 304 and least two main landing gear 308 coupled beneath the fuselage 310 with a landing gear compartment 309 contained within the wing 338 and fuselage 310 that is capable of stowing the landing gear 308. The wing 338 has a gull form with a dihedral at a trailing edge and gradually straightening forward toward the region of the landing gear compartment 309.

In the illustrative embodiment, the aircraft 300 can have spatial constraints that call for relatively long landing gear 308 to supply sufficient clearance to engine nacelles 328 that are mounted on the lower surface of the wings 338. An additional spatial constraint is that the space for stowing the landing gear 308 is limited, both in length and volume. A landing gear with joints or folds greatly expands the volume for stowing the gear, weight, and complexity. To avoid the difficulties and complexities of a folding or jointed gear, the landing gear 304 and 308 have a straight strut without folds or hinges. A further design constraint for a supersonic aircraft configuration with a braced wing is that the engines and nacelles 328 are aft-mounted to enable supported by the aircraft tail.

Figure 3A:
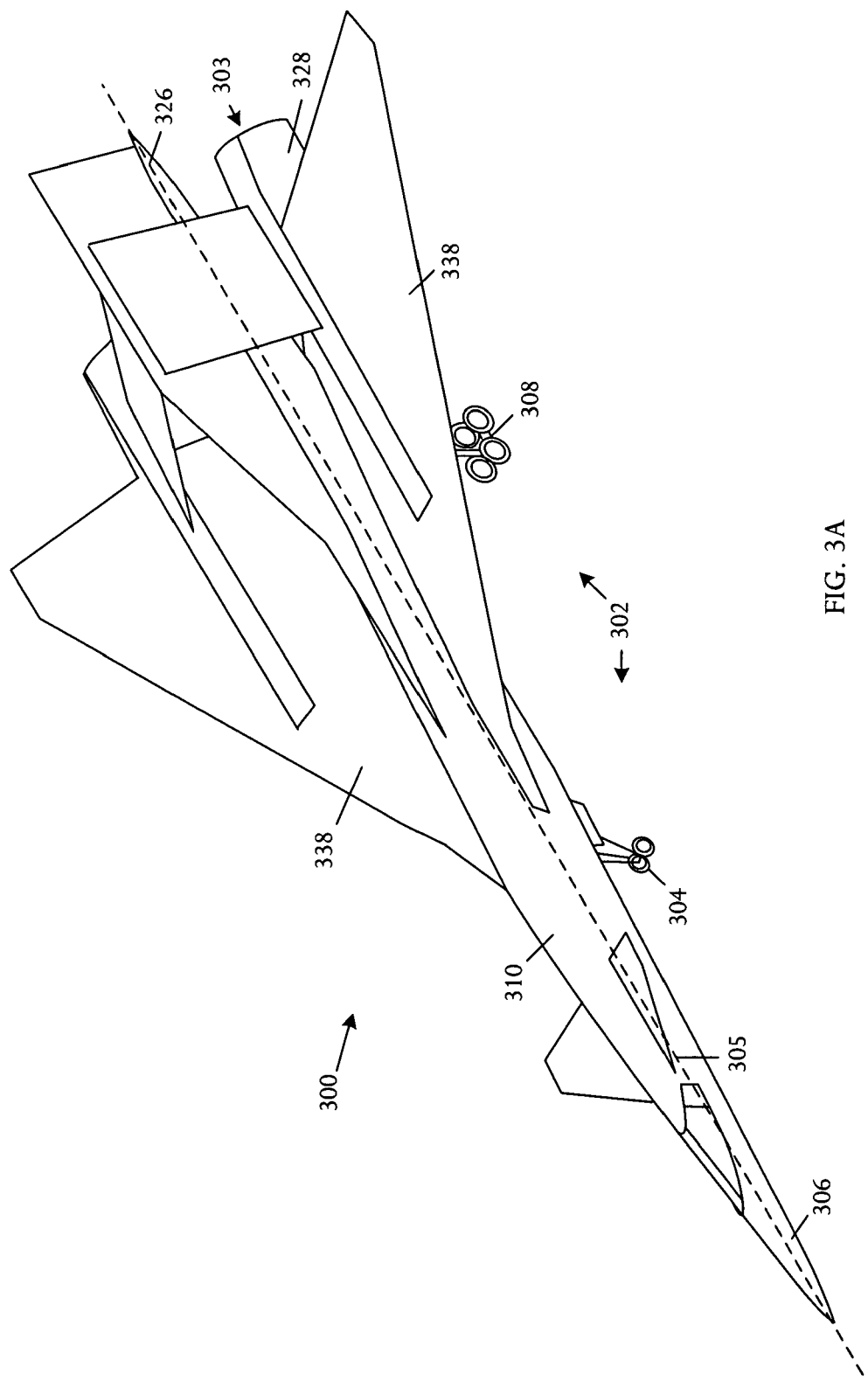
FIGS. 3A through 3F are multiple schematic pictorial diagrams illustrating multiple views of an embodiment of an aircraft with a landing gear integration that facilitates sonic boom reduction or minimization.

The illustrative landing gear system 302 enables ground mobility and airframe support during taxiing, takeoff and landing. FIG. 3A is a perspective top view showing the illustrative landing gear system 302 as a retractable tricycle gear that includes a single forward landing gear 304 located near the aircraft nose 306, and a dual main landing gear 308 located aft, outboard of a center body or fuselage 310.

In the illustrative embodiment, the nose landing gear 304 includes two wheels 312 directly below a nose landing gear beam 314 and retracts and extends in aftward and forward directions, respectively. Each main landing gear 308 has four wheels 316, two forward and two aft of a main landing gear beam 318, and retracts and extends in forward and aftward directions, respectively. Aftward extension in flight is assisted by gravity and air stream forces for failsafe extension in emergency and failure conditions.

Figure 3B:
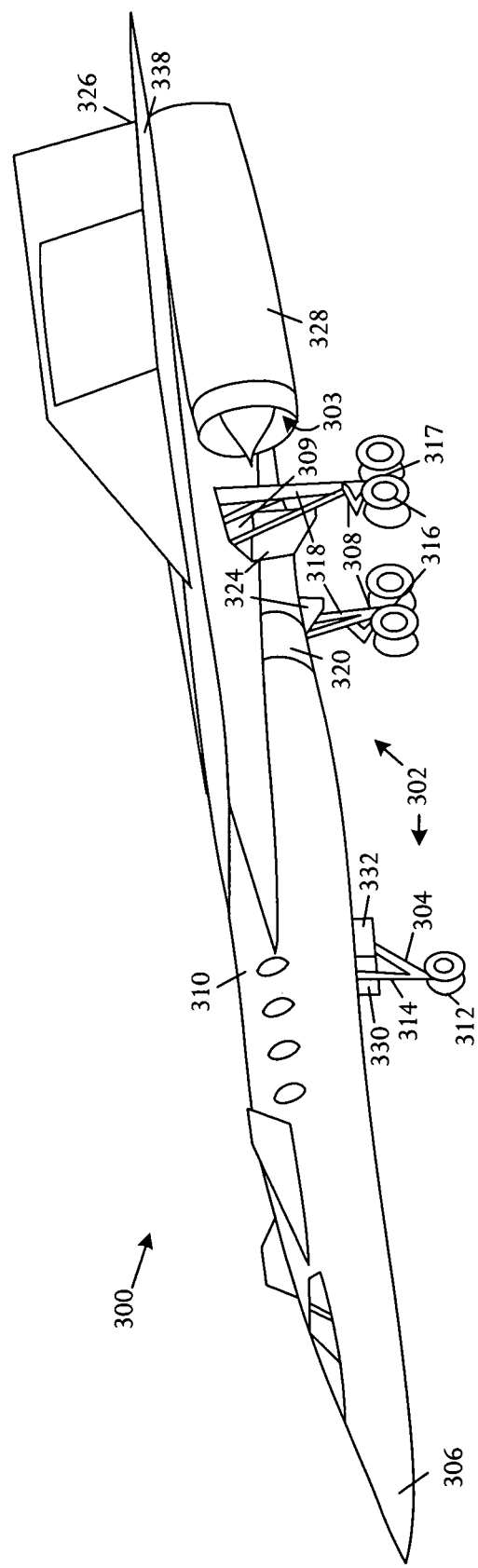

FIG. 3B is a perspective side view of the landing gear system 302 with the nose landing gear 304 and the dual main landing gear 308 extended and fuselage landing gear doors 320 closed. The landing gears 304 and 308 are retracted during cruise flight. The landing gear 304 and 308 are extended an in a locked position. The landing gear 304 and 308 supply sufficient clearance between the tail 326 and the lower aft part of the engine nacelle 328 during rotate takeoff and high angle flare landing operations.

The main landing gear 304 is located forward and inboard of the engine nacelles 328. The described main landing gear 304 and integration of the landing gear configuration within the aircraft structure facilitate ground stability. In the illustrative embodiment, the aircraft 300 has a structure that increases stability by increasing tail scrape angle and widening the wheel base. The tail scrape angle is increased by lowering the fuselage 310 and raising the engines and nacelles 328, for example by virtue of a gulling of the wing 338 that relatively raises the engine.

The retracted main landing gear 304 fits into the wing 338 at an angle that matches the wing dihedral. Wing dihedral increases the aerodynamic stability of the aircraft 300 and benefits engine/wing iteration to reduce drag. In some embodiments, the wing 338 includes Krueger flaps and the leading edge of the wing 338 extends in an essentially straight line to facilitate using a simple hinge line that accommodates the Krueger flaps. Some embodiments have a wing 338 with reduced leading and trailing edge sweeps.

Wheels of a four-wheel truck 317 are aligned fore and aft in the fuselage 310 to reduce or minimize cross-sectional volume and compactly stored in a landing gear compartment or wheel well 309. The main landing gear geometry integrates into the inboard wing dihedral of the aircraft 300 and has a size that fits into a compact fuselage volume by virtue of the forward and inboard retraction. The main landing gear geometry also conforms to available load paths of the aircraft structure to react to landing gear loads.

The main landing gear 304 have sufficient length to supply ground clearance between the engine nacelles 328, aft-body of the airframe 310, wingtips, and engine nacelles with respect to the runway or static ground line. To reduce or minimize the risk that the landing gear will fail to extend, the tall main landing gear 304 omits shortening mechanisms including folding and hinge structures. The aircraft accommodates the tall main landing gear 304 by retracting the gear forward and inboard into the main landing gear compartments 309 that similarly angle in a forward and inboard direction.

In some embodiments, the inboard portion of the wing 338 is configured to integrate with the nacelle and a diverter formed between the nacelle and the wing 338 to follow the contour of a low-sonic-boom fuselage 310 with as close a normal intersection as possible to attain low interference drag. In some embodiments, an inboard flap hinge line is fully contained within the wing contour with the wing 338 upper and lower surfaces held as planar as possible to facilitate seal design.

With the resulting wing configuration, the wing gull raises the engines and nacelles 328 to increase available tip back angle and reduce thrust-induced pitching moments. The gull enhances low-boom signature by vertically staggering the wing longitudinal lift distribution and lowers the aircraft body or fuselage 310 to reduce the height of the cabin door above the ground, thereby reducing entry stair length. The low fuselage 310 assists in maintaining a low aircraft center of gravity, reducing tip over angle and promoting ground stability. The wing gull forms a wrapping of the wing 338 around the nacelle that enhances favorable interference between the inlets and the wing 338, resulting in a wing/body/nacelle geometry conducive to successful ditching and gear-up landings.

Figure 3C:
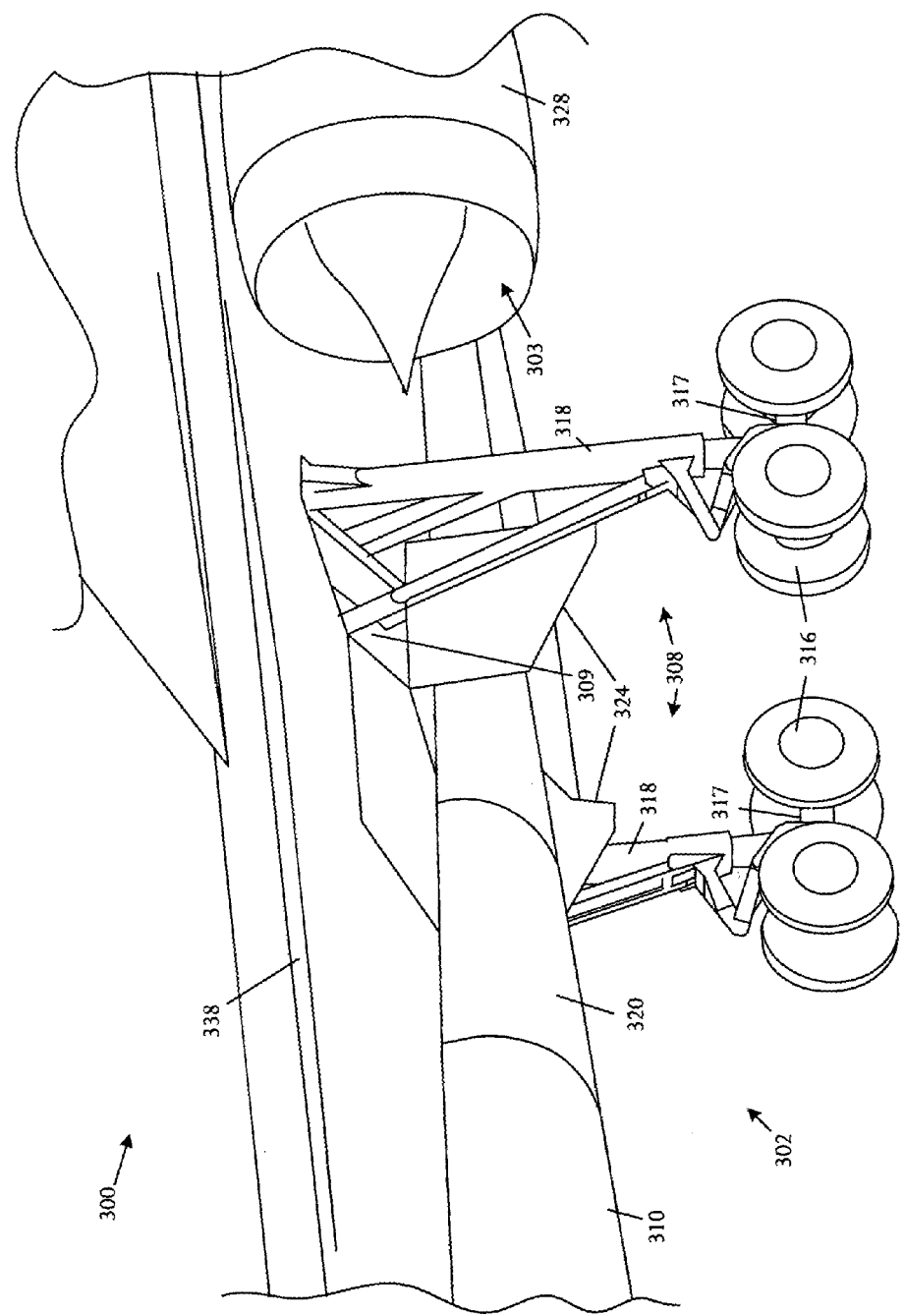

FIG. 3C shows a more detailed left side view of the main landing gear section. In the illustrative embodiment, main landing gear compartment 309 (wheel wells) and doors are separated into three areas including forward 320, middle 322, and aft 324 doors and associated wheel wells. When the main landing gears 308 are extended, the forward 320 and middle 322 doors are closed. Only the aft main landing gear doors 324 remain in an open position. The aft main landing gear doors 324 are always in the opened position when the main landing gears 308 are extended.

Figure 3D:
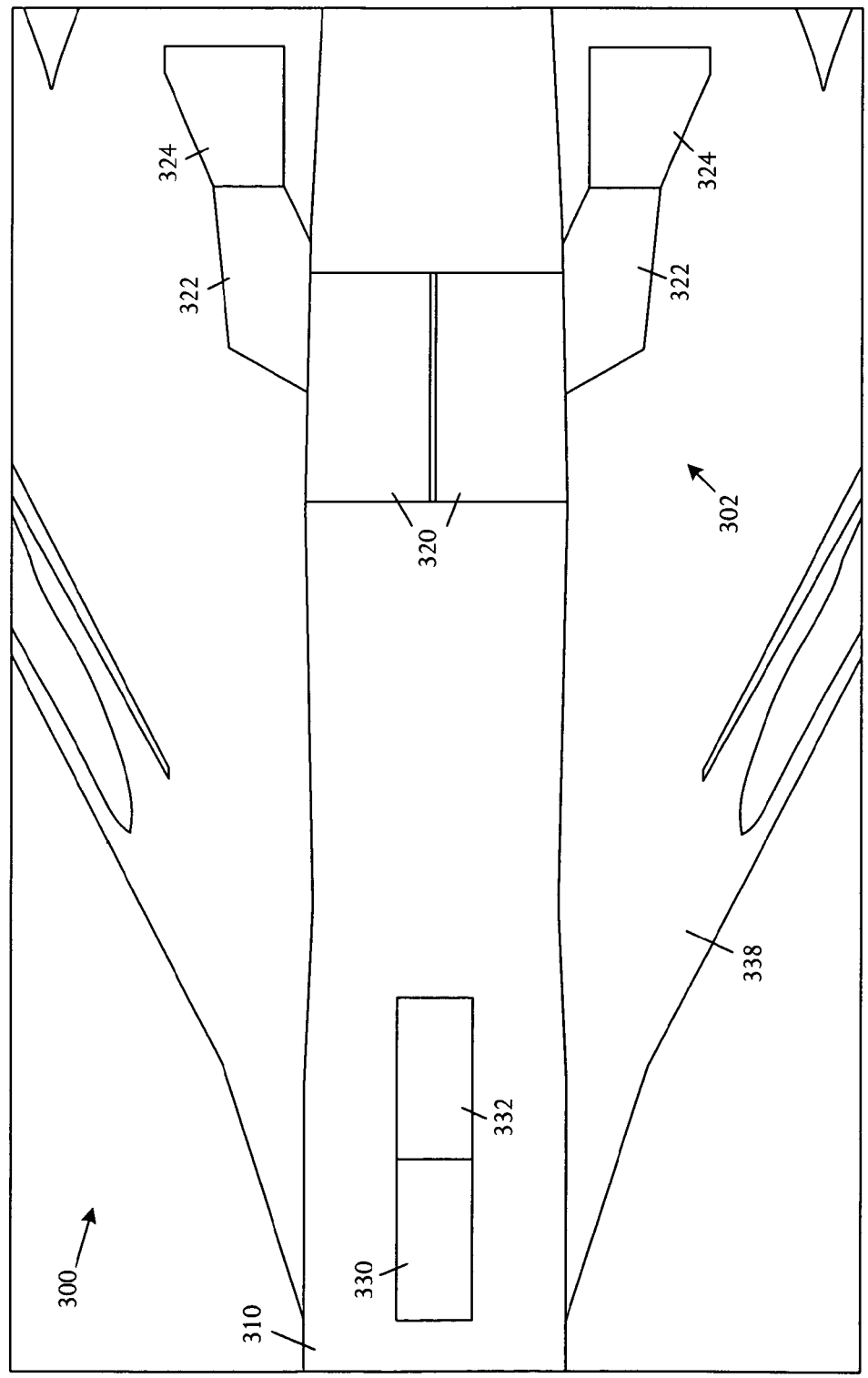

FIG. 3D illustrates a bottom view of the landing gear compartment 309 and doors of the aircraft 300. The nose landing gear 304 and the main landing gears 308 are retracted and all gear doors, including forward 330 and aft 332 nose gear doors, and forward 320, middle 322, and aft 324 main landing gear doors. The fuselage 310 has a generally rounded form, including a rounded form on the lower surface. In the vicinity of the landing gear 308, for example in the region of the fuselage 310 including the forward main landing gear doors 320, the fuselage 310 is flattened into a more square shape to form a more compact landing gear compartment 309 and improve aerodynamics. The flattened or elliptical cross-section of the fuselage 310 enables sufficient volume for housing the landing gear when stowed and reduces aircraft cross-sectional area. The flattened fuselage 310 in the vicinity of the main landing gear 308 reduces aircraft cross-sectional area while maintaining width, increasing directional stiffness and raising the fuselage lower surface for increased ground clearance.

Gulling of the wing 338 is configured so that the wing trailing edge has a strong dihedral form. Moving more forward, the wing dihedral straightens so that the wing 338 is substantially straight at the location of the main landing gear 308. Gulling of the wing enables greater tip clearance at takeoff roll and improves the lifting length for sonic boom reduction.

Figure 3E:
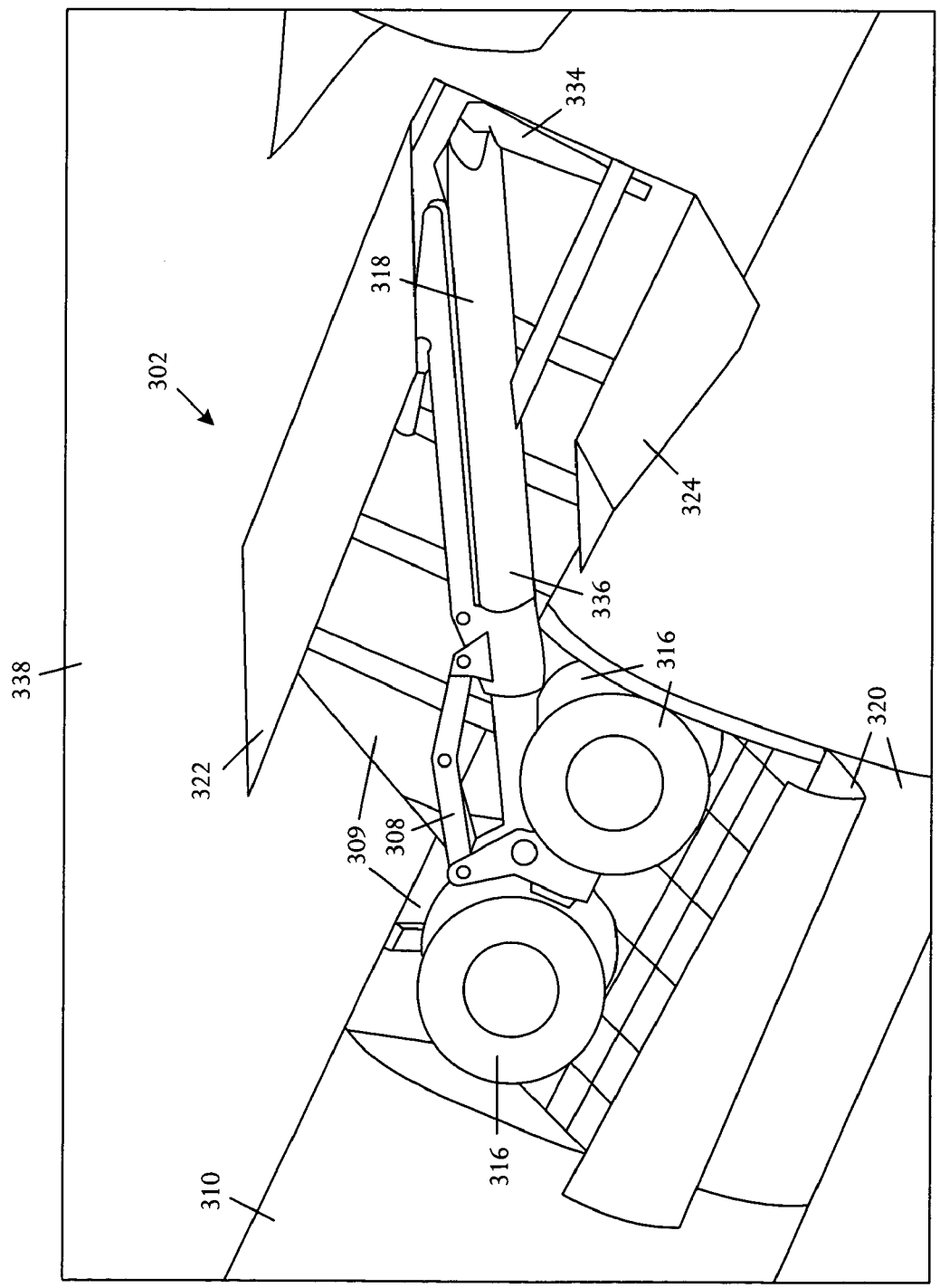

FIG. 3E depicts a bottom view of the left main landing gear 308 in the retracted position with forward 320, middle 322, and aft 324 main landing gear doors open on the left side of the aircraft 300. The right side main landing gear doors are shown in a closed position. Also shown are the left main landing gear trunnion link 334 and strut 336. The trunnion 334 is actuated to move the strut 336 during extension and retraction of the landing gear 308.

Figure 3F:
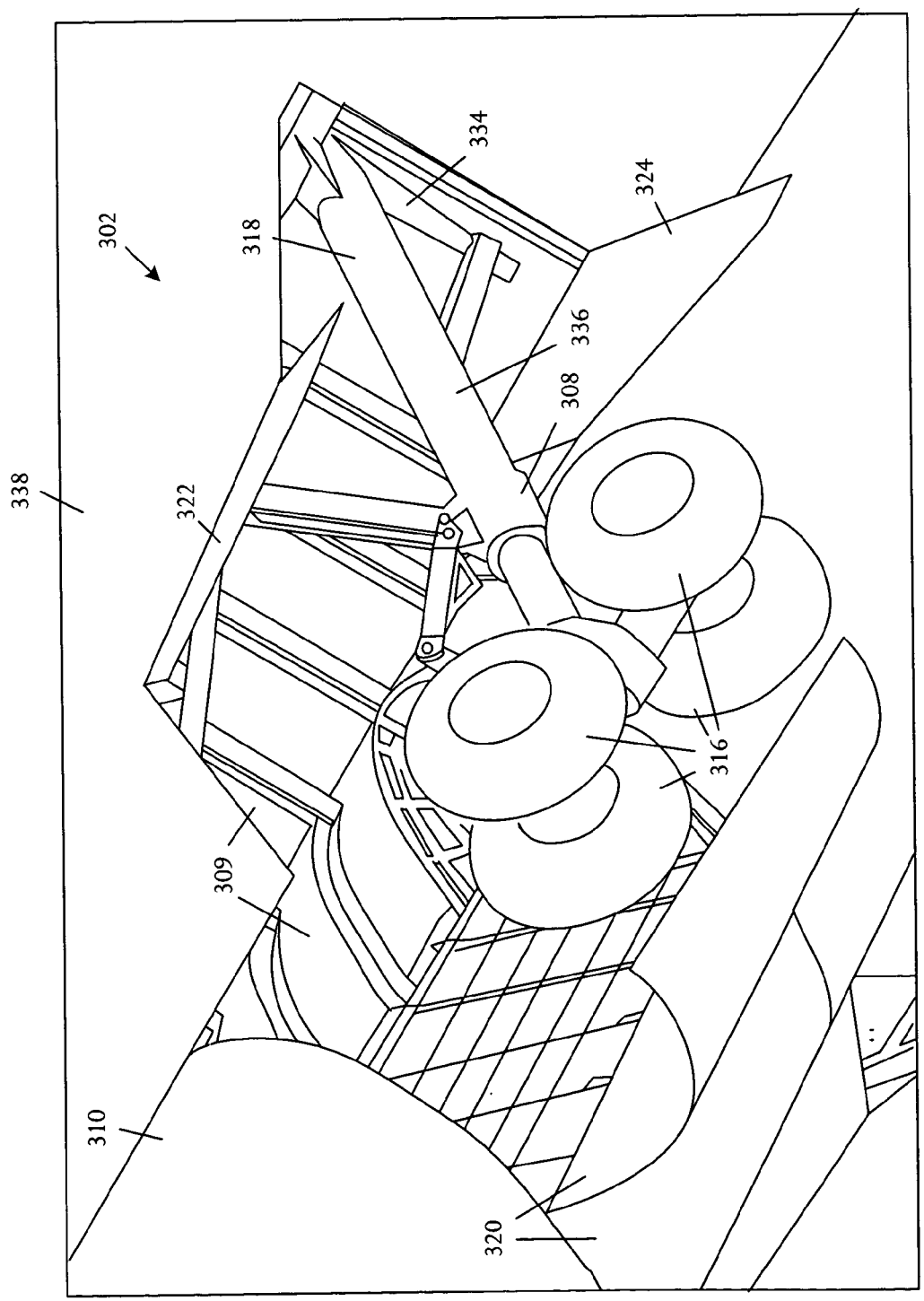

FIG. 3F shows a bottom view of the left main landing gear 308 during retraction. In the illustrative conditions, the left landing gear strut 336 is partially retracted at about a 60° angle from the fully extended position. A high axial load is imposed on the main gear trunnion link 334 due to non-normal angle between the main strut 336 and the trunnion axis which is reacted into the wing structure 338. The landing gear 308 retracts to an angle that follows airfoil contours of an inboard dihedral. The landing gear 308 fits within local airfoil contours and is stored in the landing gear compartment 309 within the airfoil 303.

Figure 4:
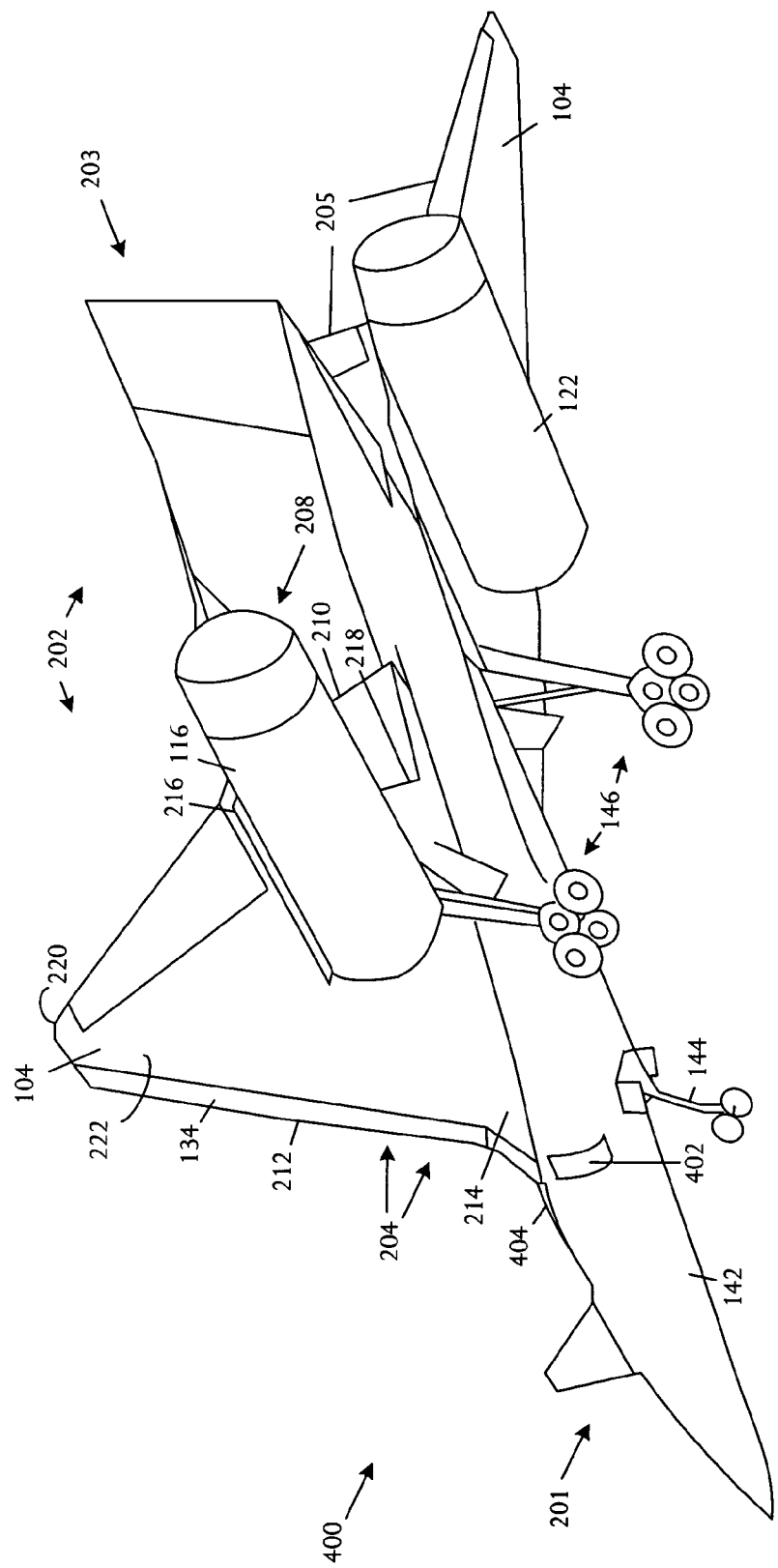
FIG. 4 is a perspective pictorial diagram illustrating an embodiment of an aircraft with a door configured into the side of the fuselage.

Referring to FIG. 4, a perspective pictorial diagram illustrates and embodiment of an aircraft 400 with a door 402 configured into the side of the fuselage 142. The wing 104 has a high-incidence airfoil angle leading edge intersection or a strake 404 intersection with the fuselage 142 that enables the wing 104 or strake 404 to function as a rain gutter above the cabin door 402.

Referring to FIGS. 5A, 5B, 5C, and 5D, a series of graphs illustrate theory upon which a low sonic boom signature is attained by integration of airfoil, nacelle, and landing gear for sonic boom reduction 102, reducing sonic boom loudness while maintaining long supersonic range.

The integration of airfoil, nacelle, and landing gear for sonic boom reduction 102 utilizes a gulled wing to improve lifting length for sonic boom reduction. Generally, the larger the dihedral of the wing, the greater the lifting length for sonic boom reduction. Dihedral of the gulled wing also allows additional clearance for engine nacelles mounted on the lower surface of the wings. Other aspects of aircraft design limit the form and configuration of the dihedral. In an illustrative embodiment, the landing gear and leading edge control devices limit wing dihedral. In some embodiments of the illustrative aircraft, the wing is constrained to be straight in the region of landing gear retraction. Furthermore, the illustrative leading edge Krueger flaps impose a straight leading edge configuration on the wing. Accordingly, the dihedral or gulling of the wing can be applied to the trailing edge of the wing, inboard of the engine nacelles, and have appropriate aerodynamics to improve lifting length and reduce sonic boom.

The illustrative configuration of the main landing gear with a non-folding, non-hinged strut, forward and inboard retraction, and a landing gear compartment with a flattened or squared form in contrast to the otherwise rounded fuselage form facilitates compact landing gear storage while enabling a fuselage structure that assists sonic boom reduction. The flattened fuselage in the vicinity of the main landing gear is configured to control or reduce drag.

The integration of airfoil, nacelle, and landing gear for sonic boom reduction 102 reduces sonic boom loudness by shaping the sonic boom for low shock strengths. FIG. 5A is a graph showing the pressure distribution from a conventional supersonic aircraft. The pressure distribution coalesces into an N-wave at the ground, a shape corresponding to the largest shock strength and thus the greatest loudness. One technique for reducing sonic boom amplitude at the ground involves a minimization theory in which a pressure distribution caused by a low boom aircraft follows an inversely calculated distribution to generate low shock strength at the ground. Contrary to intuition, a low boom distribution occurs when a strong leading edge compression quickly reduces in magnitude, followed by a gradually increasing weak compression that rapidly inverts into a weak expansion, followed by a stronger trailing edge expansion that gradually recompresses to ambient. Boom minimization occurs when an aircraft produces an inversely calculated pressure distribution without sacrificing performance. The pressure distribution produced by an aircraft results from a Mach angle, cross-sectional area distribution, for example as shown in FIG. 5B, and a Mach angle lift distribution, as shown in FIG. 5C.

The integration of airfoil, nacelle, and landing gear for sonic boom reduction 102 operates to raise the aerodynamic lifting surface of the airfoil, shifting the lifting length of the aircraft back. The extended lifting length significantly reduces sonic boom amplitude. The extended lifting length thereby shapes the active area distribution to reduce sonic boom amplitude at the ground. A minimized pressure distribution, shown in FIG. 5D, occurs when the sum of the area pressure distribution and the lift pressure disturbance equal the minimized pressure distribution. The leading edge devices described herein can be used to shape the pressure distribution.

Figure 6:
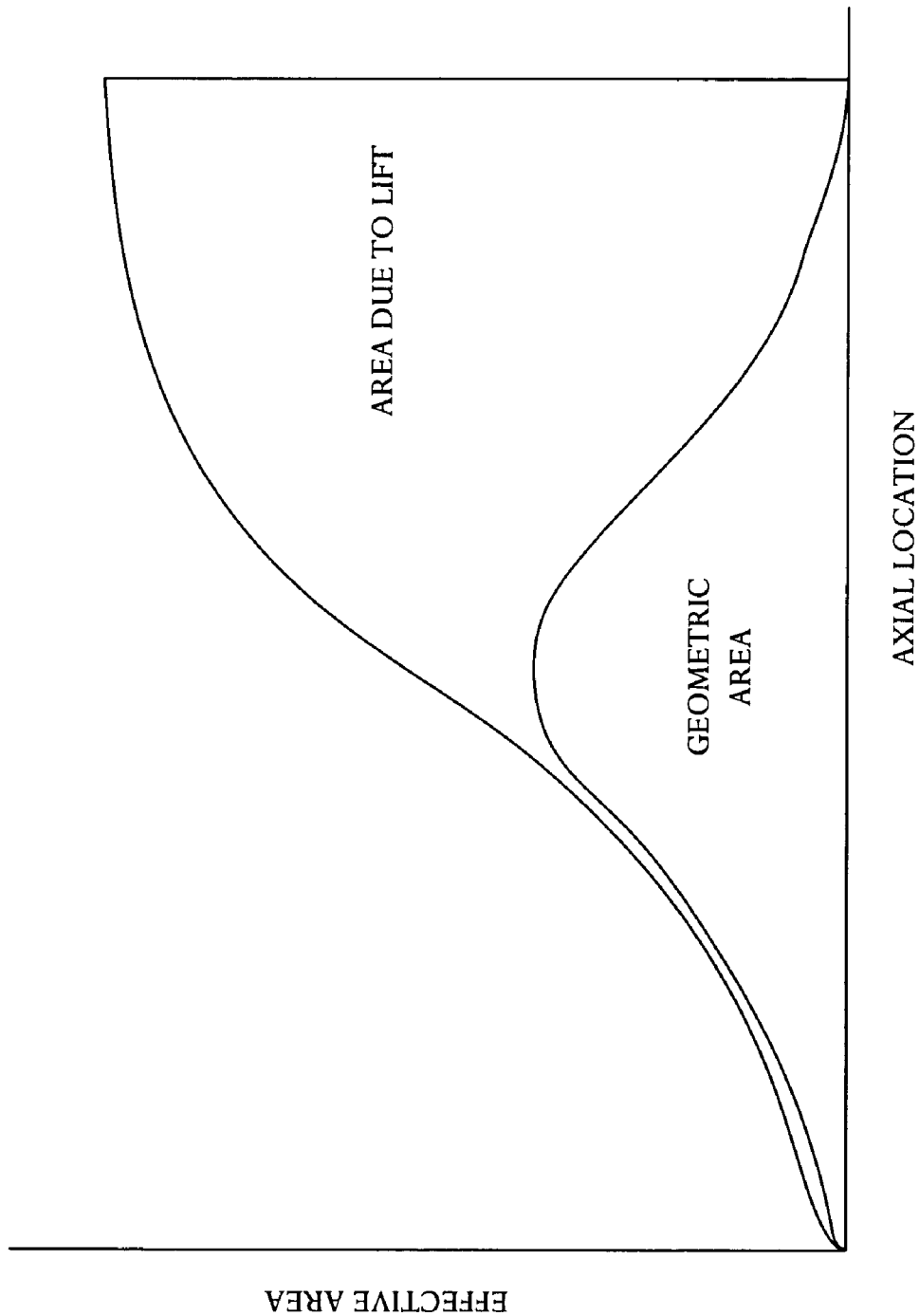
FIG. 6 is a graph that further illustrates theory of equivalent area minimization to reduce sonic boom signature, showing effective area against axial location along the longitudinal axis of the aircraft.

Referring to FIG. 6, a graph further illustrates theory of equivalent area minimization to reduce sonic boom signature, showing effective area against axial location along the longitudinal axis of the aircraft. When equivalent area due to geometric area and lift sum to the minimized distribution, a minimized ground sonic boom occurs. The thickness/camber control device is controlled to modify the airflow, counteracting the spillage shock generated by the nacelles, and stretching the lifting length to move the active area distribution closer to the distribution that shapes the sonic boom signature.

Referring again to FIGS. 1A through 1C, the illustrative aircraft 100 utilizes integration of airfoil, nacelle, and landing gear for sonic boom reduction 102, in accordance with an equivalent area technique to reduce sonic boom signature. Equivalent area is the Mach angle area distribution of an axisymmetric body that generates the same disturbance as a given geometric area or given lift distribution. The equivalent area due to geometric area can be approximated as equal to the Mach angle area distribution. The equivalent area due to lift is equal to the integral of the Mach lift per unit of stream wise length times atmospheric constants.

In the illustrative embodiment, the wing dihedral or gull reduces or minimizes sonic boom by improving lifting length of the aircraft 100. For example, if the aircraft 100 is flying in an off-design condition in which the nacelles 122 are spilling air and are thus generating stronger shocks and stronger compressions, the wing dihedral compensates by extending the lifting length.

The wings and engine are generally designed for selected for usage at various air speeds. Engine 116 and inlet 118 characteristics are configured to coordinate engine airflow schedules and flight Mach number. In a particular embodiment, a fixed geometry inlet 118 can be utilized, for example to reduce propulsion system weight and complexity, and thereby improve efficiency and performance. In particular fixed-geometry inlet configurations, airflow is matched at all pertinent Mach numbers so that no bypass or excessive subcritical spillage occurs under nominal conditions. Airflows at off-nominal conditions are matched using engine trim.

In one embodiment, an inlet/engine configuration is based on a supersonic aircraft engine that maintains a status range of 3600 nautical miles (nmi) at Mach 1.8. The fixed compression geometry engine inlet is optimized for Mach 1.8. A maximum Mach 1.8 capable design represents performance of the Mach 1.8-designed engine cruising at Mach 1.6. The Mach 1.8-capable engine flying at Mach 1.6 increases range and engine life, and potentially improves performance on hot-temperature days.

In an alternative embodiment, an engine 116 is configured with a fixed compression geometry inlet optimized for Mach 1.6, increasing range to approximately 4250 nmi by increasing lift/drag ratio by a full percentage point, and a lower engine weight enabling more fuel to burn in cruise.

Various design techniques can be used to configure an aircraft for a range capability that is greater than a baseline Mach 1.8 point design approach, yet supply a greater speed capability than a Mach 1.6 point design method. One technique is to design a Mach 1.6 inlet and engine and cruise off-design at Mach 1.8 to improve range over a Mach 1.8 design inlet, for example attaining a 150–250 nmi improvement in range. A second technique involves designing the aircraft as a Mach 1.6 point design for maximum range and accepting any overspeed capability that happens to occur, resulting in a small speed increase for a fully optimized Mach 1.6 engine design that is further limited by engine life reduction as well as degradation of inlet stability and distortion. In a slight variation to the second approach, the engine can be configured as a Mach 1.6 point design with the engine and subsystem design Mach numbers tailored to any speed a Mach 1.6 inlet is capable of attaining in an overspeed condition. The range benefit is even smaller than the effect of a pure Mach 1.6 aircraft but the overspeed capability can be improved although not to the level of a Mach 1.8 design. A third approach incorporates a variable geometry inlet into an otherwise Mach 1.8 configuration so that efficient on-design inlet performance can be obtained from a range from Mach 1.6 to Mach 1.8, resulting in a small range penalty due to higher weight and higher losses inherent to the variable geometry inlet. Mach 1.6 performance of the third approach is further hindered due to increased inlet weight.

In a fourth approach, the inlet design Mach number is set such that a Mach 1.8 cruise can be attained in an overspeed condition with engine, subsystem, and aerodynamic design configured to maximize range at Mach 1.6. The illustrative concept does not operate on-design in a purest sense, although enabling the largest range of a fixed compression geometry inlet capable of cruising at Mach 1.8. Potentially, flight at a lower than design Mach number using the fixed geometry external compression engine can increase spillage drag and integrate the inlet and propulsion system in a manner that results in a higher drag.

An illustrative aircraft 100 can have inlet 118, engine 116, and airframe generally designed for Mach 1.8 performance, and further includes optimizations to improve various performance aspects. The configuration enables cruising at a slightly lower Mach number than 1.8 to attain a higher range performance. In an illustrative embodiment, the wings are sized slightly larger than normal for a Mach 1.8 design to improve takeoff and landing performance.

The integration of airfoil, nacelle, and landing gear for sonic boom reduction 102 facilitates operation of the aircraft 100 at off-design Mach numbers.

Other mission-related characteristics facilitated by integration of airfoil, nacelle, and landing gear for sonic boom reduction 102 include a capability to cruise at lower Mach numbers, and a tendency to cruise at lower altitudes at lower Mach numbers, resulting from an optimum lift coefficient occurring at lower altitude as a consequence of lower speed. Furthermore, suitable engines for the desired Mach performance typically produce lower specific fuel consumption at the lower altitudes. Also, lower cruise altitudes yield excess thrust at cruise, enabling a reduction is engine cruise thrust requirement and reduced engine weight. Additionally, lower cruise altitudes allow cruise to begin earlier and end later in a mission so that the aircraft spends proportionately more of a mission in a cruise condition. Also, lower cruise Mach numbers yield lower total air temperatures, benefit engine and subsystem life. Lower cruise Mach numbers can also reduce emissions.

While the invention has been described with reference to various embodiments, it will be understood that these embodiments are illustrative and that the scope of the invention is not limited to them. Many variations, modifications, additions and improvements of the embodiments described are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the invention. Variations and modifications of the embodiments disclosed herein may be made based on the description set forth herein, without departing from the scope and spirit of the invention as set forth in the following claims.

What is claimed is:

1. A supersonic cruise configuration aircraft comprising:
a fuselage extending on a longitudinal axis from a forward nose to an aft tail formed in an inverted V-tail geometry;
a wing coupled at an inboard section to the fuselage and extending to an outboard tip, the wing having a leading edge and a trailing edge; and
a landing gear coupled to the wing and configured to stow into the wing and the fuselage on retraction and having a landing gear strut,
the wing formed in a gull configuration including a dihedral at an angle that is largest at the most inboard wing portion, the wing at the dihedral configured to enclose the landing gear strut on landing gear retraction and formed to enhance low-sonic-boom signature by staggering aircraft longitudinal lift distribution.

2. The aircraft according to claim 1 further comprising:
a leading edge flap coupled to the leading edge of the wing, the leading edge flap beginning at a location outboard of the inboard wing portion and extending outboard a selected distance; and
the wing is formed with a highly swept configuration that has a reduced outboard dihedral relative to the larger inboard wing dihedral and is essentially straight near the leading edge.

3. The aircraft according to claim 2 further comprising:
an engine coupled to the wins inboard of a wing outboard portion; and
the wing gull has a slight outboard dihedral in a range from 0° to 5° configured to enable gravity fuel feed assistance from the outboard wing toward a more inboard engine while reducing outboard wing dihedral.

4. The aircraft according to claim 3 wherein:
the slight outboard dihedral has an angle of approximately 2°.

5. The aircraft according to claim 1 further comprising:
the fuselage configured with a flattened or elliptical cross-section that houses the landing gear when stowed and reduces aircraft cross-sectional area, the fuselage cross-section configured in combination with the wing gull to produce low-sonic-boom and low induced drag, forming a tailored local wins contour at a location of landins gear retraction.

6. The aircraft according to claim 1 further comprising:
the fuselage configured with a flattened or elliptical cross-section that reduces aircraft cross-sectional area while maintaining width, increasing directional stiffness and raising the fuselage lower surface for increased ground clearance.

7. The aircraft according to claim 1 further comprising:
a door configured into the fuselage side; and
a high-incidence airfoil angle wing leading edge or strake intersection with the fuselage that enables the wing to function as a rain gutter above the open door.

8. An aircraft comprising:
a fuselage extending on a longitudinal axis from a forward conical tip nose to an aft tail formed in an inverted V-tail geometry;
a wing coupled at an inboard section to the fuselage and extending to an outboard tip, the wing having a leading edge and a trailing edge;
a leading edge flap coupled to the leading edge of the wing; and
a landing gear coupled to the wing and configured to stow into the wing and the fuselage on refraction, the landing gear being stowed within the wing at a selected chordwise location between the wing leading and trailing edges,
the wing having an inboard dihedral that is straight near the leading edge and angled at the chordwise location of the landing gear to facilitate leading edge flap deployment and sealing.

9. The aircraft according to claim 8 further comprising:
the leading edge flap configured to extend full-length of the wing leading edge inboard from the fuselage to the outboard wing tip; and
the wing formed in a gull configuration including a dihedral at an angle that is largest at the most inboard wing portion, the wing at the dihedral configured to enclose the landing gear strut on landing gear retraction and formed to enhance low-sonic-boom signature by staggering aircraft longitudinal lift distribution.

10. The aircraft according to claim 8 further comprising:
an engine coupled to the wing inboard of a wing outboard portion; and
the wing gull has a slight outboard dihedral in a range from 0° to 5° configured to enable gravity fuel feed assistance from the outboard wing toward a more inboard engine while reducing outboard wing dihedral.

11. The aircraft according to claim 10 wherein:
the slight outboard dihedral has an angle of approximately 2°.

12. The aircraft according to claim 8 further comprising;
the fuselage configured with a flattened or elliptical cross-section that houses the landing gear when stowed and reduces aircraft cross-sectional area, the fuselage cross-section configured in combination with the wing gull to produce low-sonic-boom and low induced drag, forming a tailored local wing contour at a location of landing gear retraction.

13. The aircraft according to claim 8 further comprising:
the fuselage configured with a flattened or elliptical cross-section that reduces aircraft cross-sectional area while maintaining width, increasing directional stiffness and raising the fuselage lower surface for increased ground clearance.

14. The aircraft according to claim 8 further comprising:
a door configured into the fuselage side; and
a high-incidence airfoil angle wing leading edge or strake intersection with the fuselage that enables the wing to function as a rain gutter above the open door.

15. A supersonic aircraft comprising:
a fuselage extending along a longitudinal axis forward to a conical tip nose and aft to an inverted V-tail;
a wing coupled inboard to the fuselage and extending outboard, the wing having a leading edge, a trailing edge, and a gull that is most pronounced inboard;
at least two engines coupled beneath the wing; and
at least two nacelles encasing the engines and coupled beneath the wing at an aft position and supported by the inverted V-tail;
a main landing gear that couples to the wing and comprises a drag strut assembly that retracts into the wing and wheel truck that retracts into the fuselage,
the wing gull having a slight outboard dihedral in a range from 0° to 5° to enable gravity fuel feed assistance from the outboard wing inboard toward the engines while reducing outboard wing dihedral.

16. The aircraft according to claim 15 wherein;
the slight outboard dihedral has an angle of approximately 2°.

17. The aircraft according to claim 15 further comprising:
the fuselage configured with a flattened or elliptical cross-section that houses the landing gear when stowed and reduces aircraft cross-sectional are, the fuselage cross-section configured in combination with the wing gull to produce low-sonic-boom and low induced drag, forming a tailored local wing contour at a location of landing gear retraction.

18. The aircraft according to claim 15 further comprising:
the fuselage configured with a flattened or elliptical cross-section that reduces aircraft cross-sectional area while maintaining width, increasing directional stiffness and raising the fuselage lower surface for increased ground clearance.

19. The aircraft according to claim 15 further comprising:
a door configured into the fuselage side; and
a high-incidence airfoil angle wing leading edge or strake intersection with the fuselage that enables the wing to function as a rain gutter above the open door.

20. An aircraft comprising:
means for holding passengers and/or cargo that extends from a conical tip nose to an inverted V-tail;
means for lifting the aircraft and extend from inboard bilaterally to outboard ends; and
means for supporting the aircraft on the ground in motion and when the aircraft is stationary, the supporting means being coupled to the lifting means and capable of stowing partially within the lifting means and partially within the holding means when the supporting means is retracted,
the lifting means being gulled with a dihedral at an angle that is largest inboard and aligns with the retracted supporting means, the lifting means having a minimum thickness sufficient to enclose the supporting means.

* * * * *